(12) United States Patent
Karhu

(10) Patent No.: US 6,470,190 B2
(45) Date of Patent: *Oct. 22, 2002

(54) SYSTEM FOR REMOTELY ACCESSING DATA STORED IN A RADIOTELEPHONE

(75) Inventor: Jukka-Matti Karhu, Gelsenkirchen (DE)

(73) Assignee: Nokia Mobile Phone Ltd., Espoo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/141,008

(22) Filed: Aug. 26, 1998

(65) Prior Publication Data

US 2001/0055964 A1 Dec. 27, 2001

(30) Foreign Application Priority Data

Aug. 28, 1997 (GB) .............................................. 9718376

(51) Int. Cl.$^7$ .............................. H04Q 7/32; H04Q 7/20
(52) U.S. Cl. ........................ 455/550; 455/418; 455/419; 455/420; 455/557
(58) Field of Search ................................. 455/408, 418, 455/419, 412, 420, 422, 550, 556, 557, 411, 517, 414, 559, 352, 353, 404

(56) References Cited

U.S. PATENT DOCUMENTS

| | | | |
|---|---|---|---|
| 5,046,082 A | * 9/1991 | Zicker et al. ................. 455/419 |
| 5,109,403 A | 4/1992 | Sutphin ........................ 379/59 |
| 5,189,632 A | 2/1993 | Paajanen et al. ........ 364/705.05 |
| 5,257,257 A | 10/1993 | Chen et al. .................... 370/18 |
| 5,276,729 A | * 1/1994 | Higuchi et al. .............. 455/418 |
| 5,349,697 A | 9/1994 | Pelkonen ....................... 455/89 |
| 5,353,328 A | 10/1994 | Jokimies ...................... 379/58 |
| 5,392,282 A | 2/1995 | Kiema ........................... 370/77 |
| 5,563,931 A | * 10/1996 | Bishop et al. ............... 455/403 |
| 5,608,778 A | * 3/1997 | Partridge, III .............. 455/411 |
| 5,631,947 A | 5/1997 | Wittstein et al. .............. 379/59 |
| 5,657,371 A | 8/1997 | Suomi et al. ................ 455/418 |
| 5,684,873 A | 11/1997 | Tiilikainen .................. 379/354 |
| 5,710,810 A | 1/1998 | Tiilikainen .................. 379/355 |
| 5,790,875 A | 8/1998 | Andersin et al. ....... 395/750.03 |
| 5,802,465 A | 9/1998 | Hamalainen et al. ........ 455/403 |
| 5,995,824 A | * 11/1999 | Whitfield .................... 455/412 |
| 6,026,293 A | * 2/2000 | Osborn ........................ 455/418 |
| 6,026,308 A | * 2/2000 | Hsieh .......................... 455/557 |
| 6,166,652 A | * 12/2000 | Benvenuti ................... 455/419 |

FOREIGN PATENT DOCUMENTS

| | | |
|---|---|---|
| EP | 0 780 273 A1 | 6/1997 |
| GB | 2 249 923 A | 5/1992 |
| WO | WO 94/30023 | 12/1994 |

OTHER PUBLICATIONS

PCT International Search Report.
United Kingdom Search Report.

* cited by examiner

Primary Examiner—William Trost
Assistant Examiner—Keith Ferguson
(74) Attorney, Agent, or Firm—Perman & Green, LLP

(57) ABSTRACT

A system comprising plurality of radiotelephones (13) is provided which supports the remote accessing of data stored in the memory of a radiotelephone (13). A communications apparatus (10) transmits dialled information comprising a radiotelephone identifier and a data access request, and a controller (11) controls connection of that apparatus with the radiotelephone (13) identified in the dialled information.

14 Claims, 8 Drawing Sheets

(A)

(B)

(C)

SYSTEM FOR REMOTELY ACCESSING DATA STORED IN A RADIOTELEPHONE

BACKGROUND OF THE INVENTION

Field of the Invention

The present invention relates to a radiotelephone having a memory and a telephone system comprising the same. In particular, it relates to a radiotelephone whose memory can be remotely accessed and a system which supports such remote access.

SUMMARY OF THE INVENTION

According to one aspect of the present invention, there is provided a radiotelephone comprising: a memory for storing data; a transceiver for supporting a call with a communications apparatus and receiving dialled information from a communications apparatus; a decoder for analyzing the dialled information to determine whether data access is requested; and a controller for controlling the access of data stored in the memory, in response to a data access request.

Such a radiotelephone supports the remote accessing of data from its memory.

The controller may control the transceiver to transmit access data to a device in response to a data access request. In this way, the transfer of data from the radiotelephone's memory is controlled remotely. It may be forwarded to a terminal, such as a radiotelephone, a fixed line phone, or a computer. Alternatively, it may be transmitted to the communications apparatus which provided the dialled information.

Optionally, the controller may use the accessed data to control the radiotelephone itself and/or a device to which the radiotelephone is directly or indirectly connected. For example, the controller may control the radio telephone to delete stored data or refresh its battery. It may also control a device, such as a heater, to which it is coupled via an output port.

Preferably the decoder analyses the dialled information to determine whether it comprises a password. This provides security protection for the data.

The radiotelephone may comprise a plurality of memories. In this event, the decoder may be arranged to analyze the dialled information to determine from which memory data access is requested, so that the controller can control the access of the data stored in that memory accordingly.

According to another aspect of the present invention there is provided a radio communications system, comprising: an input for receiving dialled information from a communications apparatus, the dialled information comprising a radiotelephone identifier and a data access request; and a controller, responsive to the dialled information, for controlling connection of the communications apparatus and the radiotelephone identified in the dialled information, and for controlling forwarding of the data access request to the said radiotelephone.

Preferably the system comprises means for forwarding data transmitted by the radiotelephone in response to the data access request to the input.

According to a further aspect of the present invention, there is provided a telephone system comprising a communications apparatus for transmitting dialled information comprising a radiotelephone identifier and a data access request; a plurality of radio telephones according to the present invention; and a controller, responsive to the dialled information, for controlling connection of the communications apparatus and the radiotelephone identified in the dialled information, and for controlling forwarding of the data access request to the radio telephone.

BRIEF DESCRIPTION OF THE DRAWING

Embodiments of the present invention will now be described, by way of example, with reference to the accompanying drawings, of which.

DETAILED DESCRIPTION OF THE PREFERRED EMBODIMENT

Figure 1:
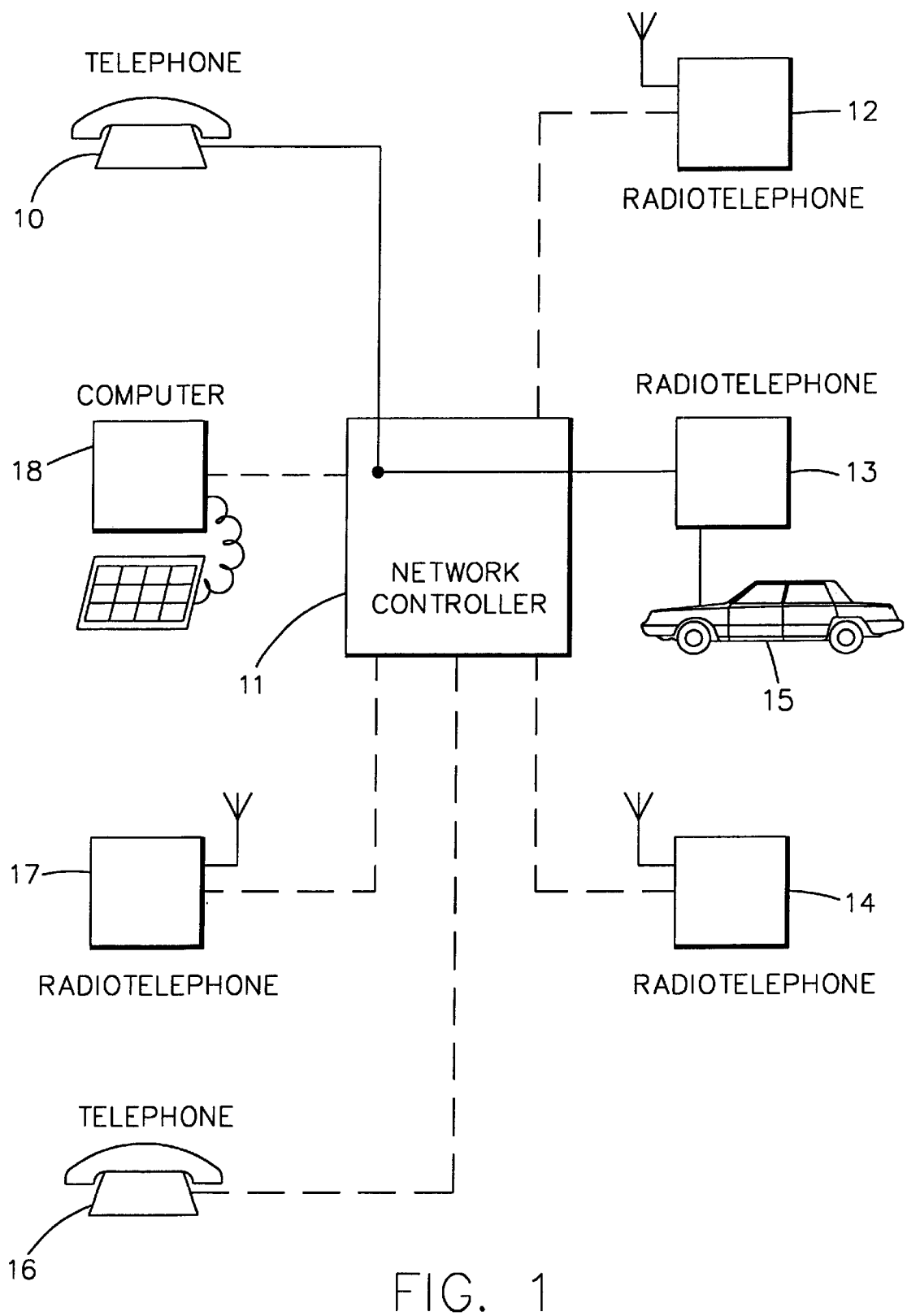
FIG. 1 shows a telephone system according to an embodiment of the present invention.

FIG. 1 of the accompanying drawings shows the telephone system according to a preferred embodiment of the present invention. It comprises a telephone 10 which can be connected to one of the plurality of radiotelephones 12 to 14 under control of the controller 11. Likewise, the radiotelephones 12 to 14 can be connected, via controller 11, to another telephone 16, a radiotelephone 17, or a computer 18 via a modem. Also, the radiotelephone 13 can be connected to an external device 15, such as a car telephone, or a car computer via an output port.

Remote accessing of data from one of the radiotelephones 12 to 14 is effected as follows. Telephone 10 provides dialled information comprising the phone number of the radiotelephone 13 whose data is required, and a data access request. The controller sets up a call between the telephone 10 and the requisite radiotelephone 13, and forwards the data access request to the radiotelephone 13. Assuming that the data access request is valid, the data is accessed and forwarded to the desired device. For example, the controller may forward the data to the telephone 10 as shown in FIG. 1. Alternatively, it might set up a call between the radiotelephone 13 and another device, such as telephone 16, radiotelephone 17 or computer 18, so that the access data is forwarded to that device. One further option is that the access data from the radio telephone 13 is forwarded to the device 15 connected to an output port of the radiotelephone.

Figure 2:
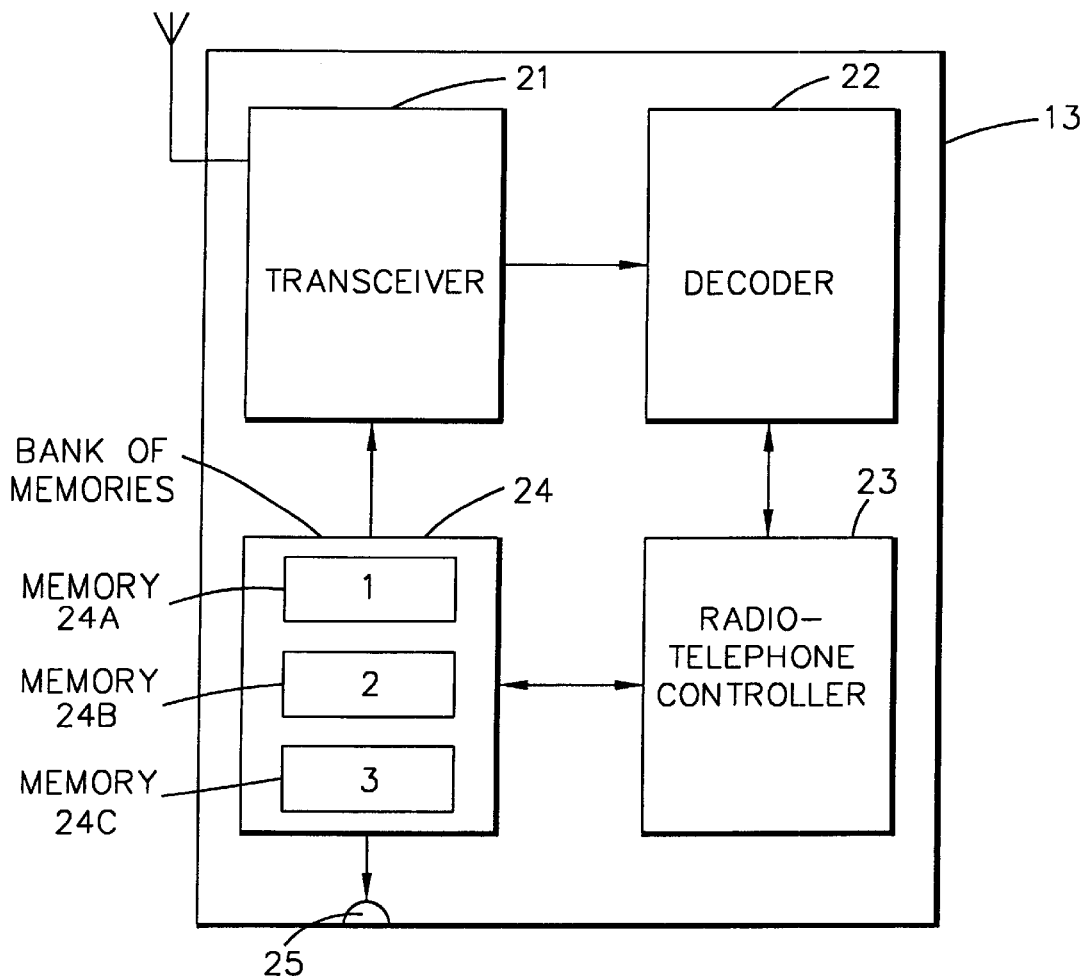
FIG. 2 shows a radiotelephone according to an embodiment of the present invention.

FIG. 2 shows a radio telephone according to a preferred embodiment of the present invention. The radio telephone 13 comprises a transceiver 21 for transmitting and receiving data, and a decoder for decoding dialled information received by the transceiver 21. The transceiver may, for example, receive dialled information as DTMF (Dual Tone Multiple Frequency) signals, in which case the decoder is a DTMF decoder, for translating tones back into associated characters such as digits 0–9. In this embodiment the radiotelephone also comprises a bank 24 of memories 24a to 24c for storing data, and a controller 23 for controlling the access of data stored in the memories 24a to 24c in response to the decoded dialled information, and for controlling the forwarding of accessed data to the transceiver or an output port 25. Alternatively, the radiotelephone may comprise only one memory 24. Remote accessing of data stored in one of the memories 24a to 24c of the radiotelephone 13 may occur as follows.

In this embodiment dialled information is in the form of DTMF signals. For each digit dialled, a low and high tone is produced according to the following table.

| Low tone (Hz) | High tone (Hz) | | |
| --- | --- | --- | --- |
| | 1209 | 1336 | 1477 |
| 697 | 1 | 2 | 3 |
| 770 | 4 | 5 | 6 |
| 852 | 7 | 8 | 9 |
| 941 | * | 0 | # |

Assuming only data from one memory is required, then the data access request preferably indicates that memory. For example, an access request for data in memory number 1 (reference 24a in FIG. 2) may take the form #1#.

This will be represented in the dialled information received by the transceiver 21 as simultaneous low and high tones at 941 Hz and 1477 Hz, then 697 Hz and 1209 Hz and finally 941 Hz and 1477 Hz. When the dialled information is received by the transceiver 21, the decoder 22 analyses it to determine whether the data access is requested. If the aforementioned sequence of high and low tones is received, the decoder translates these tones into data representing the characters #1# and forwards the decoded signal to the controller 23. The controller recognises this as a request for data in memory number 1 (referenced 24a), and consequently allows the data in that memory to be accessed. The data accessed may be forwarded to the transceiver 21 for transmission to another device, or forwarded to a device connected to output port 25 of the radiotelephone 13. The dialled information may contain target information indicating for example the target to which the data accessed is to be sent.

Figure 3:
FIG. 3 shows dialled information of various types.
Figure 3:
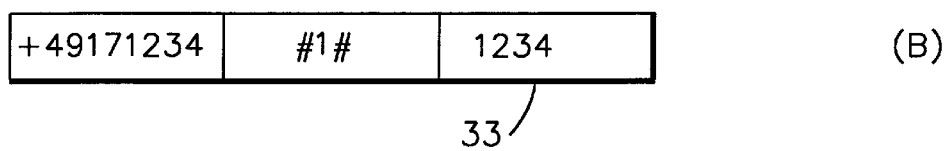
Figure 3:
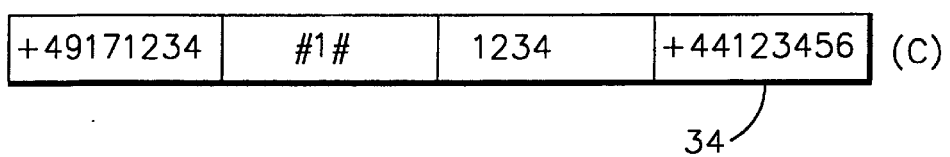

FIG. 3 shows dialled information of various types. This dialled information could be included in the GSM (Global System for Mobile Communications) specification, for example, in a similar manner to SMS (Short Message Service) information.

FIG. 3a shows dialled information comprising the phone number 31 of the radiotelephone 13 whose data is required, and a data access request 32. The network controller 11 sets up a call between the phone 10 providing the dialled information and the radiotelephone 13 identified by the phone 10. At least the data access request 32 is forwarded by the controller 11 to the radiotelephone 13. The transceiver 21 forwards this information to the decoder 22 which forwards a decoded signal to the radiotelephone controller 23, which in turn, allows access of the data requested.

FIG. 3b shows dialled information comprising the phone number 31 of the radiotelephone 13 whose data is required, and the data access request 32, as shown in FIG. 3a. However, this dialled information further comprises a password 33 for security purposes. The network controller 11 sets up a call between the phone 10 and the radiotelephone 13 identified by the phone 10, and forwards at least the data access request 32 and the password 33 to the radiotelephone 13. The transceiver 21 forwards this information to the decoder 22, which decodes the information and passes it to the radiotelephone controller 23. The controller 23 compares the password 33 with a predetermined password, and if the password 33 is correct, the radiotelephone controller 23 allows access of the data requested.

FIG. 3c shows dialled information comprising the phone number 31 of the radiotelephone 13 whose data is required, the data access request 32 and the password 33, as shown in FIG. 3b. However, it further comprises target information. As shown in this figure, target information may, for example, be the phone number of a target communications apparatus such as the telephone 10 making the request, a landline telephone 16, a radiotelephone 17, or a computer 18. Alternatively, the target information may indicate that the data is to be output to an external device 15 via the output port 25 of the radiotelephone 13. Another possibility is that the target information indicates that the data is to be used to control the radiotelephone 13. For example, data in memory 1, (referenced 24a) may be an instruction to clear data from memory 2, (referenced 24b).

The invention may be embodied in numerous forms, some of which are exemplified in FIGS. 4 to 8.

Figure 4:
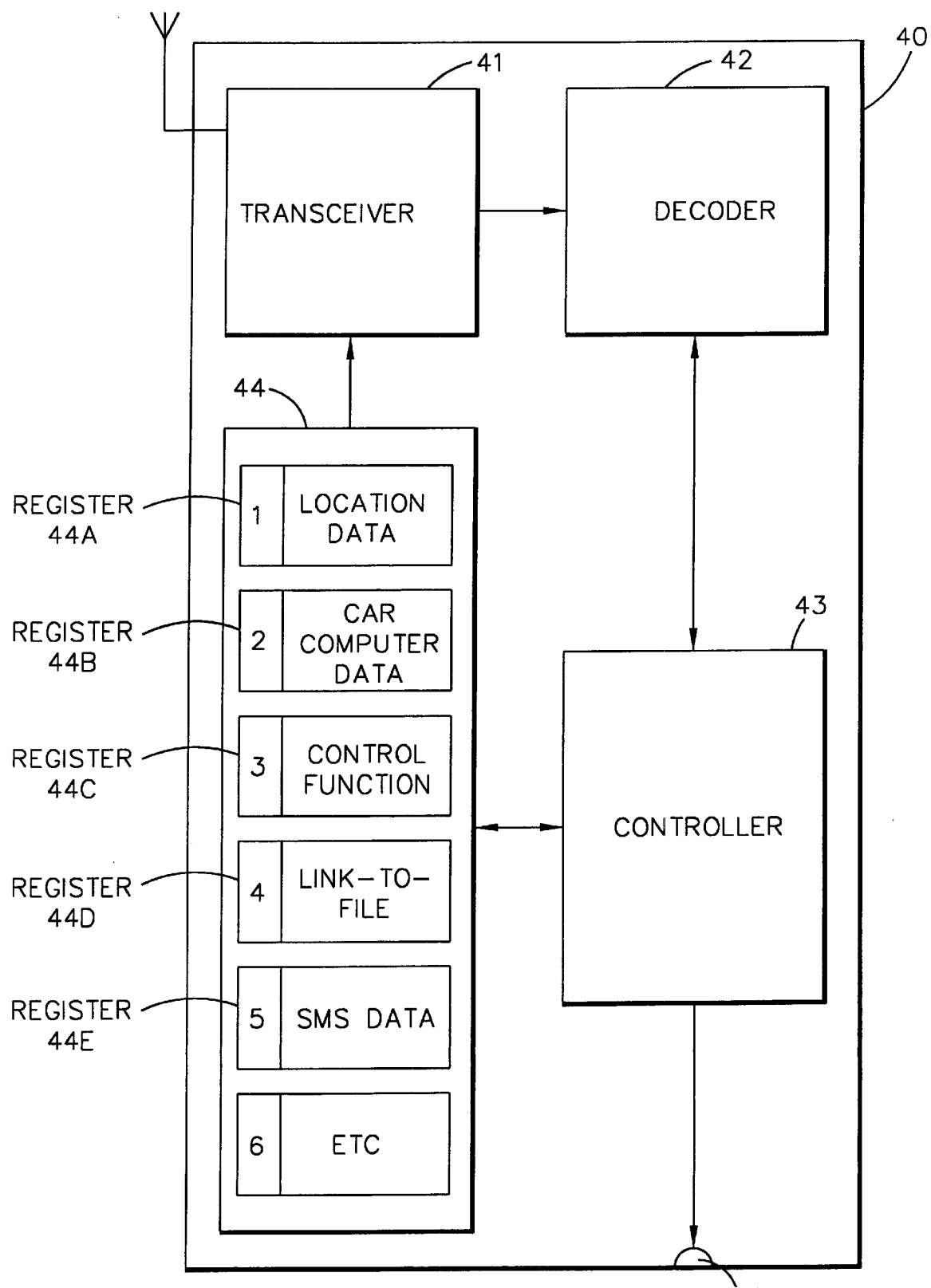
FIG. 4 shows a radiotelephone according to an embodiment of the present invention which comprises a plurality of registers having different functions associated with them.
Figure 6:
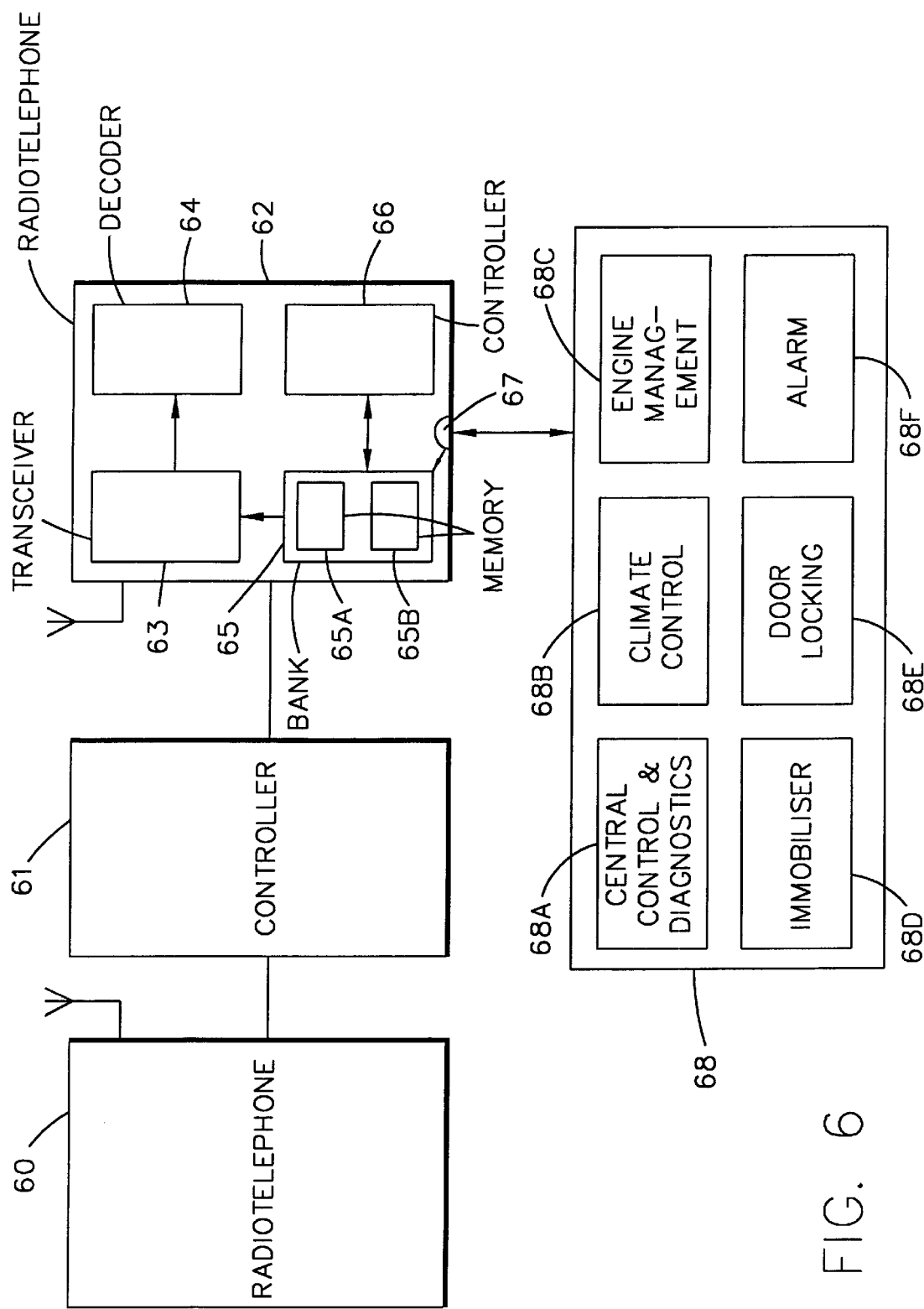
FIG. 6 shows a system according to an embodiment of the present invention in which a car computer is connected to a radiotelephone.
Figure 7:
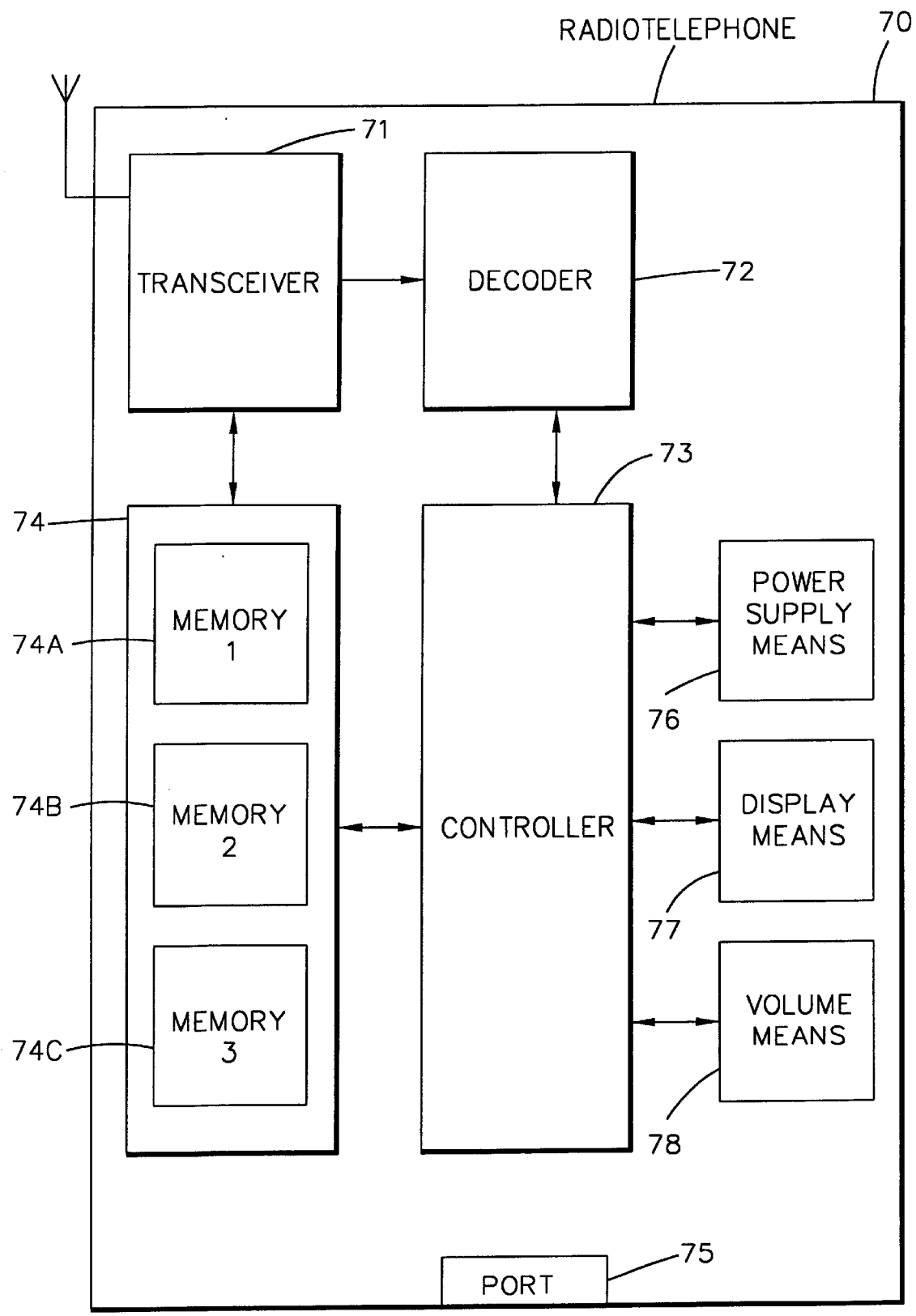
FIG. 7 shows a radiotelephone according to an embodiment of the present invention having a memory which stores control data for controlling the radiotelephone.

FIG. 4 shows a radiotelephone 40 according to a preferred embodiment of the present invention. The radiotelephone 40 comprises a transceiver 41 for transmitting and receiving data, and a decoder 42 for decoding dialled information received by the transceiver 41. The radiotelephone also comprises a plurality of registers 44a to 44e for storing data, and a controller 43 for controlling the access of data stored in those registers in response to decoded dialled information. Register number 1, referenced 44a, stores location data. That is, it stores data concerning the position of the phone. Systems concerning the retrieval of location data are exemplified in FIGS. 5a and 5b. Register number 2, referenced 44b, contains data from an external device, in this case, data from a car's computer. FIG. 6 illustrates a system in which a car's computer is connected to the output of a radiotelephone, so that data from the computer can be stored in the radiotelephone and remotely accessed when necessary. Register number 3, referenced 44c, contains control data. Such data can be data for controlling a device, such as the car computer of FIG. 6. Alternatively, it can be data for controlling the radiotelephone itself, as shown in FIG. 7. Register number 4, referenced 44d, contains data which is to be remotely accessed, for example as exemplified in FIG. 8.

To access register number 1, a caller may, for example, dial *1. Similarly, for register number 2, the caller may dial *2, for register number 3, *3 etc. In each case, assuming DTMF is used, the corresponding DTMF tones are transmitted to the radiotelephone, are received by the transceiver 41 and then forwarded to the decoder for decoding.

Figure 5A:
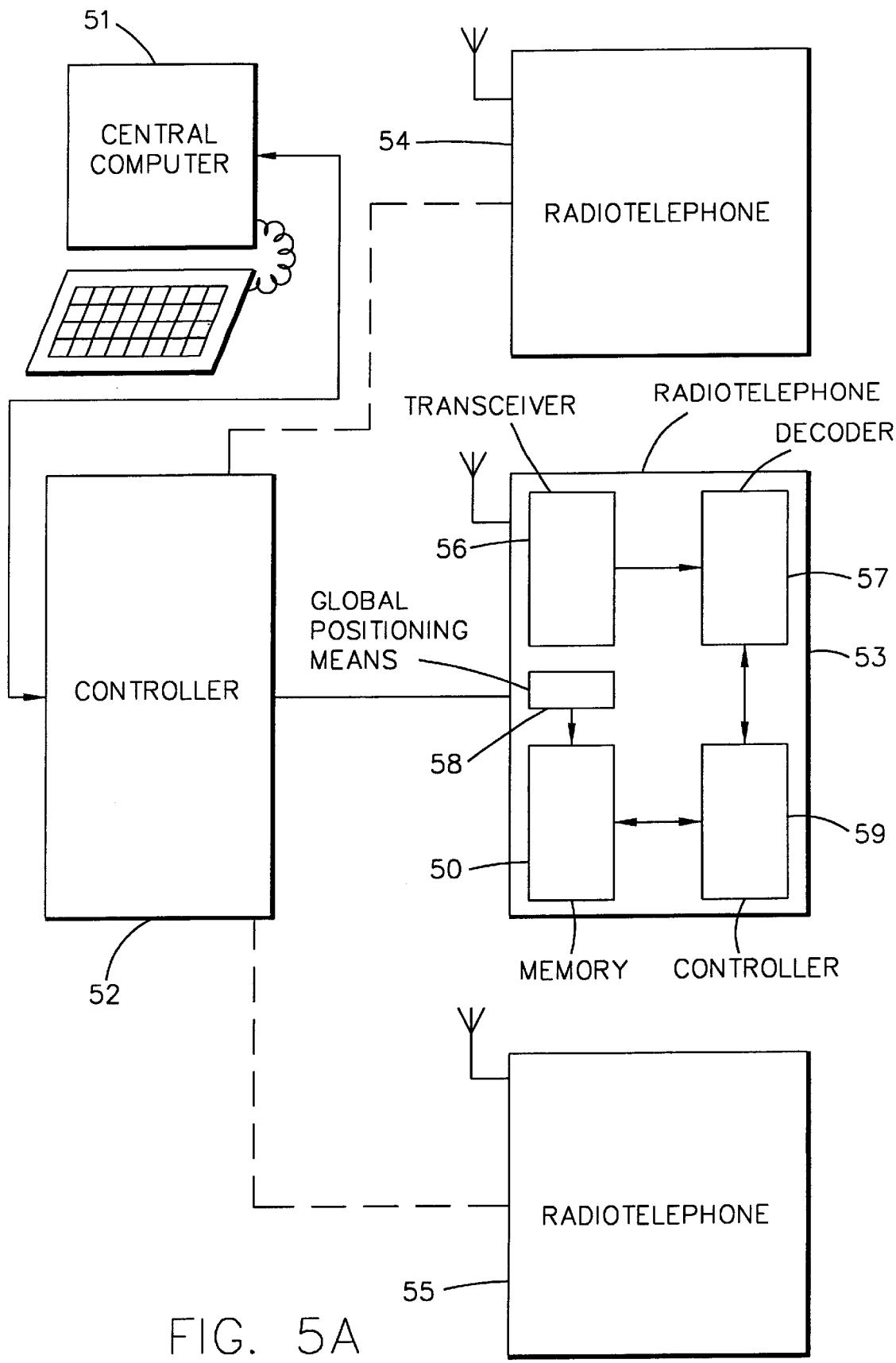
FIG. 5A shows a system according to an embodiment of the present invention in which location data is remotely accessed.

FIG. 5a shows a GSM/GPS system (Global System for Mobile Communications/Global Positioning System), which comprises a central computer 51 which can be connected to the radiotelephones 53 to 55 under control of a controller 52. The radiotelephones 53 to 55 each comprise a transceiver 56 for transmitting and receiving location data, and a decoder 57 for decoding dialled information received by the transceiver 56. They also each comprise a memory 50 for storing location data and global positioning means 58 for identifying the location of the radiotelephone and periodically updating the location data in the memory 50. A controller 59 is provided for controlling the access of data stored in the memory 50 in response to the decoded dialled information and for controlling the forwarding of the access location data to the transceiver 56.

Remote accessing of the location data by the central control 51 is effected as follows. The central control 51 provides dialled information comprising the phone number of the radiotelephone 53 whose data is required at that time, and a location data access request. The controller sets up a call between the central control and the requisite radiotelephone 53, and forwards the location data access request to the radiotelephone 53. Assuming that the data access request is valid, the location data is accessed and forwarded to the central control 51.

Figure 5B:
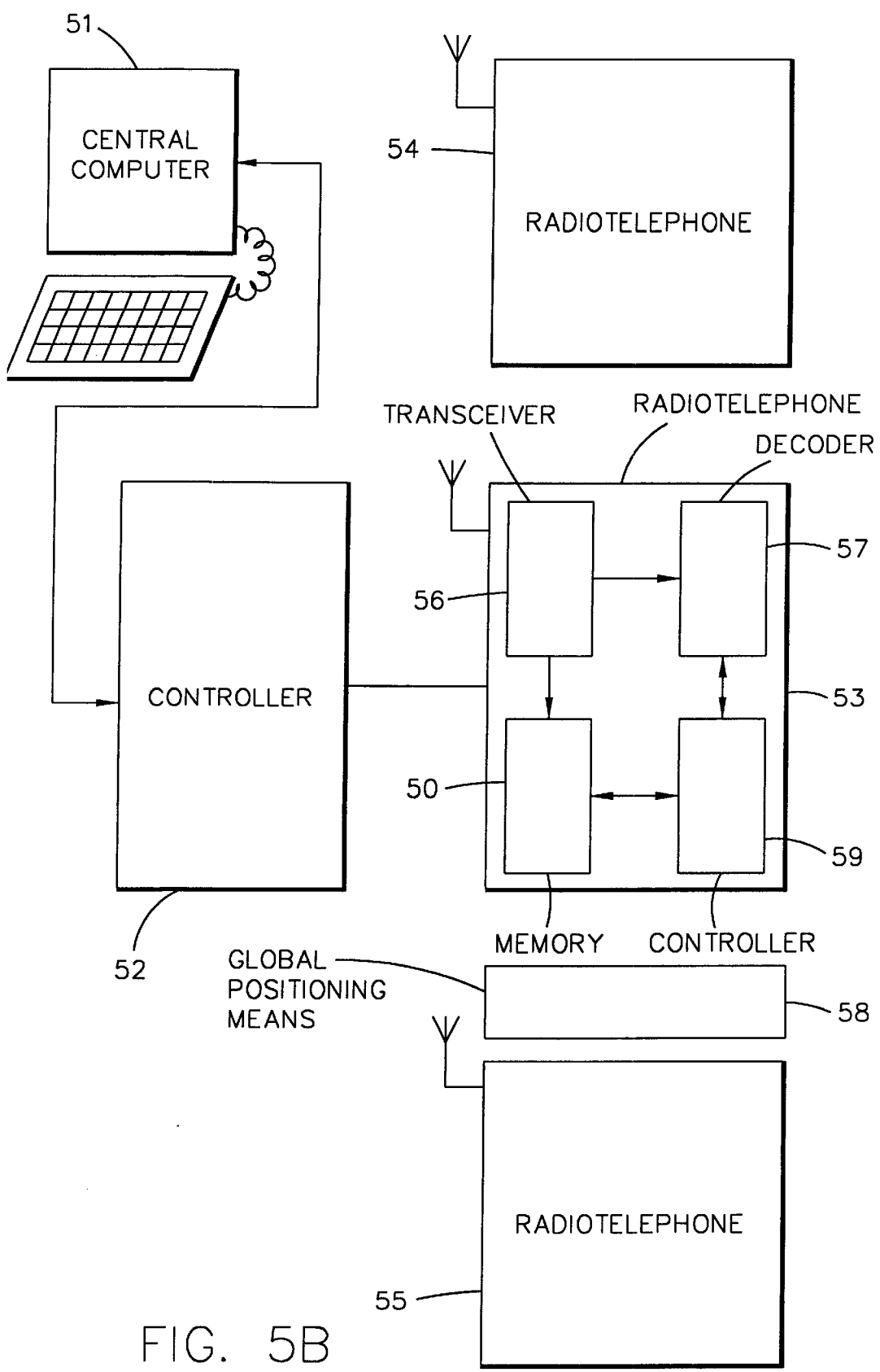
FIG. 5B shows a system according to another embodiment of the present invention in which location data is remotely accessed.

FIG. 5b shows an alternative GSM/GPS system. This system also comprises a central controller 51 which can be connected to the radiotelephones 53 to 55 under the control of a controller 52. The radiotelephone comprises a transceiver 56 for transmitting and receiving data and a decoder 57 for decoding dialled information received by the transceiver 56. It also comprises a memory 50 for storing location data and a controller 59 for controlling the access of the location data stored in the memory 50 in response to the decoded dialled information. An output port 53a of the radiotelephone is connected to a global positioning means 58. This global positioning means 58 identifies its location and transmits this location data to the radiotelephone 53 for storing in the memory 50. The data in the memory 50 may be updated periodically, in response to a data access request.

Remote accessing of the location data is effected as follows. The central control 51 provides dialled information comprising the phone number of the radiotelephone 53 coupled to the global positioning means whose position is required, and a data access request. The network controller 52 sets up a call between the central control and the requisite radiotelephone 53, and forwards the data access request to the radiotelephone 53. Assuming that the data access request is valid, the location data in the memory 50 is accessed and forwarded to the central control. Alternatively, as mentioned above, if the radiotelephone receives a valid data access request, it, in turn, may request updated location data from the global positioning means 58, which is forwarded to the memory 50 prior to the controller 59 allowing access of the location data.

The embodiments shown in FIGS. 5a and 5b could be implemented by transportation and bus companies, for example, which could automatically fetch the location data from the register of a GSM or GSM/GPS phone with no action needed by the driver. Other users could include car rental companies, package delivery companies, Police, Fire Brigade etc.

FIG. 6 shows a system according to an embodiment of the present invention, in which a car computer is connected to a radiotelephone, such as, for example, a car phone. Accordingly, data from the car computer can be remotely accessed via the radiotelephone, and also the car can be remotely controlled via the radiotelephone as outlined below.

In this embodiment, a radiotelephone 60 can be connected to one of a plurality of radiotelephones and a control of the controller 61. Radiotelephone 62 comprises a transceiver 63 for transmitting and receiving data, and a decoder 64 for decoding dialled information received by the transceiver. In this embodiment, the radiotelephone also comprises a bank 65 of memories 65a and 65b for storing data, and a controller 66 for controlling access of the data stored in the memories 65a and 65b in response to the decoded dialled information. The radiotelephone 62 is also provided with a port 67 for connection to a car computer 68. Environmental data from the car can be forwarded from the car computer 68 and stored in memory 65a.

Remote accessing of such environmental data is effected as follows. Radiotelephone 60 provides dialled information comprising the phone number of the radiotelephone 62 connected to the car controller 68, and a data access request. The network controller 61 sets up a call between the radiotelephones 60 and 62 and forwards the data access request to the radiotelephone 62. Assuming that the data access request is valid, the environmental data stored in memory 65a, forwarded from the car computer, is accessed and forwarded to the radiotelephone 60. In this way, car manufacturers can read data from a test vehicle by calling the memory 65a of the radiotelephone 62.

Also in this embodiment, the car computer 68 can be remotely controlled by the caller using radiotelephone 60. Memory 65b of the radiotelephone 62 comprises control data which is accessed and forwarded to the car computer 68 under the control of the radiotelephone's controller 66 in response to a request from the radiotelephone 60. This control data may be used to control various aspects of the car, a number of which are exemplified in FIG. 6. In this embodiment, the car computer comprises a central control and diagnostics unit 68a, a climate controller 68b, an engine management unit 68c, an immobiliser unit 68d, a door locking unit 68e, and an alarm unit 68f. Consequently, the radiotelephone 60 can remotely control the temperature of the car, so that it can be heated before the driver gets in it. Also, the radiotelephone 60 can remotely lock the doors, set the alarm or immobiliser. Moreover, car mechanics can run diagnostic tests and alter transmission control etc. remotely without the car owner having to take the car to the garage.

FIG. 7 illustrates a radiotelephone according to an embodiment of the present invention which comprises a memory for storing data for controlling the phone. This radiotelephone 70 comprises a transceiver 71 for transmitting and receiving data, and a decoder 72 for decoding dialled information received by the transceiver 71. The radiotelephone 70 also comprises a bank 74 of memories 74a to 74c for storing data and a controller 73 for controlling the access of data stored in the memories 74a to 74c in response to the decoded dialled information. The radiotelephone is further provided with a power supply means 76, display means 77, volume means 78, and a port 75 for connecting the radiotelephone 70 to an external device. In this embodiment, the memory 74a comprises control data which is accessed and used by the controller 73 to control the phone 70 in response to dialled information comprising such a request. The control data may be used to control various functions of the phone, a number of which are exemplified in FIG. 7. For example, the control data in memory 1, referenced 74a, may instruct the phone to delete data in memory 2, referenced 74b, or to store data from an external device in memory 3, referenced 74c. Also, the data in memory 1 may be used to control the power supply means 76 to turn the phone off, to control the display means 77 to turn the display back light on or off, or to control the volume means to alter the volume.

Figure 8:
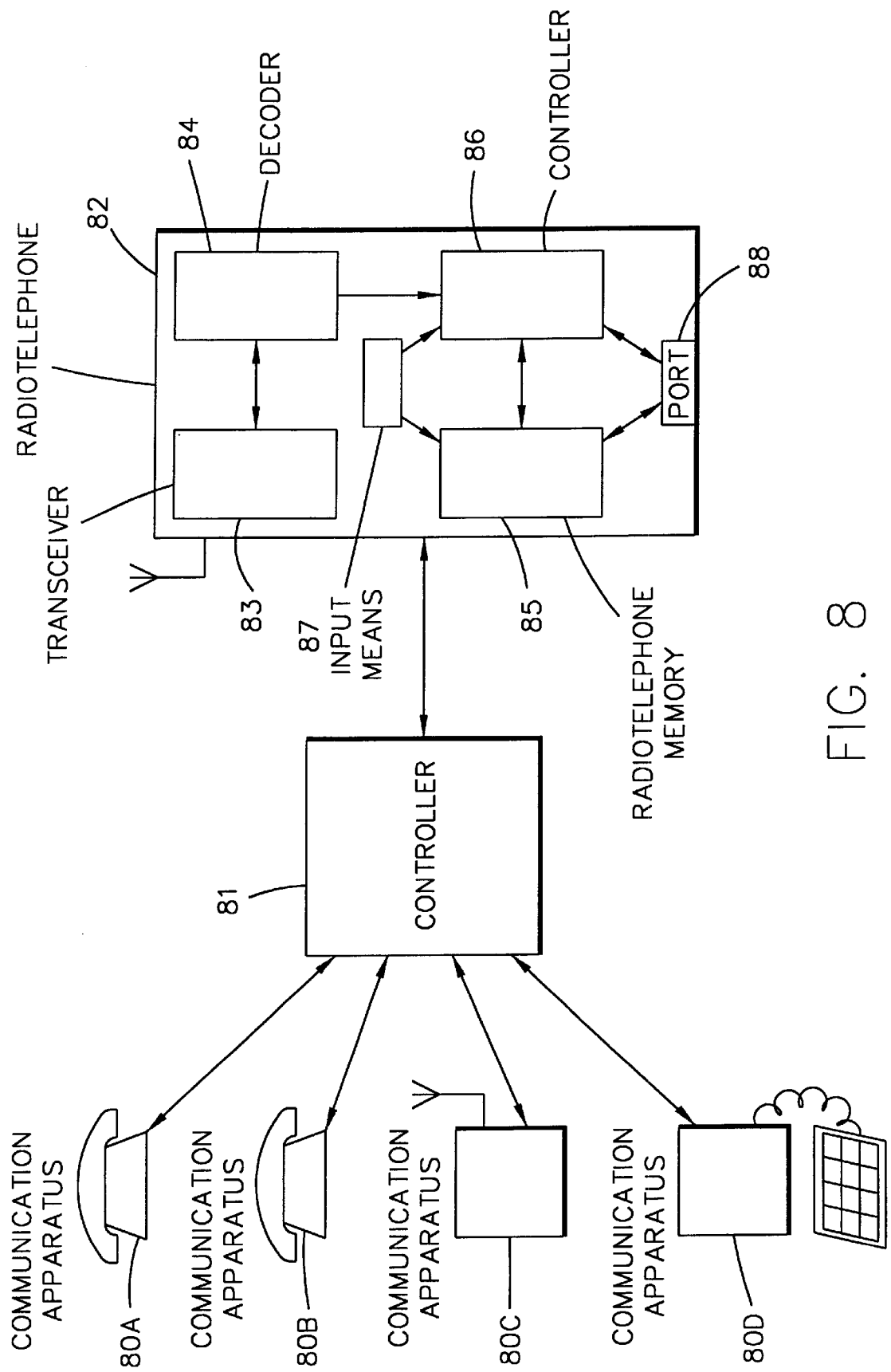
FIG. 8 shows a system in which a memory from a radiotelephone can be remotely accessed by a plurality of callers.

FIG. 8 shows a system in which memory of a radiotelephone can be remotely accessed by a plurality of callers.

This system comprises a plurality of communications apparatus 80a to 80d which can be connected to a radiotelephone 82 under control of a controller 81. The radiotelephone 82 comprises a transceiver 83 for transmitting and receiving data, and a decoder 84 for decoding dialled information received by the transceiver 83. The radiotelephone 82 also comprises a memory 88 for storing data input to the radiotelephone via an input means 87, such as a keyboard, or via a port 88, for example. A controller 86 is also provided for controlling the access of the data stored in the memory 88 in response to the decoded dialled information and for controlling the forwarding of accessed data to the transceiver for transmission to the calling communications apparatus 80a to 80d. Such a system enables the ready transfer of data. It could be used, for example, by sales headquarters, to update their central records. The radiotelephone memory 85 is updated by sales personnel, by example, via a keyboard. This memory 85 is then remotely accessed via the sales headquarters to update their central sales records.

The system may also be used to store the results of events such as sports events, an election etc., as they occur, in the radiotelephone memory 85. Then, the public are given the telephone and access numbers for the radiotelephone 82, so that they may dial in to look at the latest information.

In view of the foregoing description it would be evident to a person skilled in the art that various modifications may be made within the scope of the claims.

What is claimed is:

1. A radio communications system, comprising:
    an input for receiving dialed information from a communications apparatus, the dialed information comprising a radiotelephone identifier, a data access request, and an identifier corresponding to a location of a memory storage device where data to be accessed is located; and
    a controller, responsive to the dialed information, for controlling a connection of the communications apparatus and radiotelephone identified in the dialed information and for controlling a forwarding of the data access request to the radiotelephone and retrieving the data from the memory location and transferring the data to the communications apparatus.

2. A radio communications system as claimed in claim 1, wherein the controller is further adapted to transmit a data control signal to the memory storage device to cause the memory storage device to transmit data to the memory of the radiotelephone.

3. A radio communication system as claimed in claim 1 wherein the controller is further adapted to receive data retrieved from the memory location and to transmit the data to a device identified by the radiotelephone.

4. A radio communications system as claimed in claim 1, wherein the controller controls a transceiver to transmit data stored in the memory storage device to a communication device in response to the dialed information.

5. A radio communications system as claimed in claim 4 wherein the communications device is the communications apparatus.

6. A radio communications system as claimed in claim 1, further comprising a decoder coupled to the input and adapted to analyze the dialed information to determine the presence of a predetermined password, and wherein the controller communicates with the radiotelephone only if the predetermined password is present.

7. A radio communications system as claimed in claim 1, further comprising a decoder to analyze the dialed information to determine the presence of a predetermined password, and wherein the controller controls forwarding the data access request only if the predetermined password is present.

8. A method of accessing data from a remote location, the method comprising the steps of:
    inputting dialed information from a communications apparatus to a controller, the dialed information comprising a radiotelephone identifier, a data access request and an
    identifier corresponding to the remote location of a memory storage device where data to be accessed is located;
    identifying a radiotelephone identified in the dialed information;
    establishing a communication connection between the controller receiving the dialed information and the radiotelephone;
    forwarding a data access request from the controller to the radio telephone;
    retrieving the data from the memory location; and
    transferring the data to the communications apparatus.

9. The method of claim 8 wherein the step of forwarding further includes a step of forwarding the data from the remote location to an external device connected to an output port of the remote location.

10. The method of claim 8 further comprising the step of establishing a connection between the remote location and an external device connected to the remote location and forwarding the data from the remote location to the external device through the connection.

11. The method of claim 8 wherein the step of establishing a communication connection further comprises the step of using the controller to identify a phone number of the location of the memory storage device, access the phone number and forward the data access request.

12. The method of claim 8 wherein the controller is adapted to transmit the data from the memory location to a second external device designated by the communication apparatus sending the data request.

13. The method of claim 8 wherein the controller analyzes the radio telephone identifier for a presence of a password, and wherein the controller only establishes a connection with the location of the memory storage device if the password is present.

14. The method of claim 8 wherein the remote location is a telephone.

* * * * *